United States Patent Office 3,429,711
Patented Feb. 25, 1969

3,429,711
NUTRITIOUS INFANT CEREAL
Fred W. Billerbeck, Francisco S. Hing, and George A. Purvis, Fremont, Mich., assignors to Gerber Products Company, Fremont, Mich.
No Drawing. Filed Nov. 26, 1965, Ser. No. 510,095
U.S. Cl. 99—83                                    10 Claims
Int. Cl. A23l 1/10

ABSTRACT OF THE DISCLOSURE

A wet, precooked, nutritious fruit-rice cereal product having a pH adjusted to about 4.3–4.6 and prepared from a combination of rice flour with apple puree and banana puree, and including a sequestered iron salt.

---

This invention relates to a wet, precooked, nutritious fruit-rice cereal product having an attractive appearance and the distinctive flavor of natural fruit, and to a method for its preparation.

The modern consumer has for some time desired a wet, precooked infant breakfast food having fruit incorporated therewith. However, preparation of an appetizing combination of, for example, rice flour with apple puree and banana puree has met with little success. Consistent quality reproduction of a product free of such undesirable attributes as a thin consistency has been heretofore unobtainable. Variations in the quantity of the ingredients have not alleviated the runny texture of the final consumer product.

It has now been found that fruit cereal formulations of rice flour, apple puree and banana puree of the desired viscosity can be prepared as an attractive product through rigid control of the pH of the formulation during its preparation. The critical pH range for the combination of rice flour, apple puree and banana puree has been found to be 4.3–4.6.

Although it is not intended for the invention to be limited to any specific theoretical concept, it now appears that by adjusting the pH so that it is more basic than 4.2, i.e. 4.3, 4.4, etc., acid hydrolysis, which seems to accelerate the breakdown of starch molecules thereby producing a formulation of undesirably thin consistency, is prevented. Further experimentation with variations in the pH of the formulation has also revealed that when the pH is adjusted to be more acidic than 4.2, the product develops an undesirable sour flavor. Additionally, when the formulation is more basic than about 4.6, for example, 4.8 or 5.0, it is necessary to employ longer cooking times and higher temperatures to attain the required levels of commercial sterility. As a result of these longer cooking times and higher temperatures, the formualtion develops an overly sweet flavor and is subject to serious color degradation.

Table I illustrates the effect pH variations have on the color and taste of a formulation containing rice flour, apple puree and banana puree when the desired level of sterility is maintained.

TABLE I

| Kettle pH | Process conditions | Color | Taste |
| --- | --- | --- | --- |
| 3.8 | 32 min. at 230° F | Light buff | Sour. |
| 4.0 | 32 min. at 230° F | do | Do. |
| 4.2 | 32 min. at 230° F | Whitish | Slightly acid. |
| 4.4 | 32 min. at 230° F | do | Good. |
| 4.6 | 37 min. at 230° F | do | Do. |
| 4.8 | 47 min. at 230° F | Slight greying | Do. |
| 5.0 | 40 min. at 240° F | Pink-reddish | Sweet (burned). |
| 5.2 | 46 min. at 240° F | do | Do. |
| 5.4 | 50 min. at 240° F | Red | Do. |

In another aspect of the instant invention, it has been found that the critical pH adjustment can be most effectively accomplished through the use of a pH adjusting agent which can either be basic or acidic, depending on which pH adjustment is needed.

Alkalizing agents which have been found to be effective include salts of a strong base and weak acid, for example, disodium phosphate, sodium carbonate, sodium bicarbonate, sodium ascorbate and the like. Disodium phosphate in its anhydrous form is especially effective although other forms of disodium phosphate, i.e., dihydrate and heptahydrate, are also advantageous. Where sodium ascorbate is used, the desired pH adjustment is accomplished while at the same time enhancing the nutritive value of the product by the incorporation of Vitamin C. Acidifying agents which can be employed include food acids, such as citric, fumaric, malic, ascorbic, adipic and the like. Citric acid is especially effective. Ascorbic acid (Vitamin C) and its metal salts are especially effective in maintaining good color.

In still another aspect of the invention, it has now been found that certain diet supplements such as iron salts, in a sequestered form, can be incorporated with the formulations of rice cereal, apple puree and banana puree, provided that the critical pH range is maintained throughout the preparation and storage of the formulation. The capacity to incorporate a quantity of iron is especially significant as whole milk, the main component of infant diets, is ineffective as a carrier of iron. The iron, especially in a form easily attacked by infant digestive systems, is essential to a number of metabolic processes. For example, it is used in the formation of compounds such as hematin which constitute a large part of the chromo protein, hemoglobin.

When digestible iron salts which have not been sequestered are incorporated with the instant formulation, in the desired pH range as well as lower pH ranges, a reaction occurs which produces black flecks that impart an unattractive grey hue to the whole formulation. Although a large number of sequestering agents have been employed as reactants with iron salts in other compositions, only certain sequestering agents have been found to be effective in the instant formulation. This limited group of effective sequestering agents includes ethylenediaminetetraacetic acid (EDTA) preferably in the esterified form, such as disodium ethylenediaminetetraacetate dihydrate and disodium calcium ethylenediaminetetraacetate dihydrate. These specific sequestering agents react with the iron salts, thereby preventing catalytic oxidation activity of the iron and other undesirable reactions, such as the formation of iron tannate, when the sequestered iron salts are subsequently incorporated with the wet formulation.

As a further result of the discovery of the effectiveness of the pH adjusting agents, it is no longer necessary to employ a blend of apples to produce a puree in a specific pH range. In this regard, the pH of the apple puree may vary within wide limits, for example, from 3.0 to 5.6. Attention can now be concentrated on attempting to incorporate a blend of apples having strong yet desirable flavor characteristics, rather than those which possess a certain pH.

The amount of pH adjusting agent required will depend on the initial pH range of the apple puree as well as upon the amount of sugar and other ingredients included in the formulation, and will vary in each individual application. The amount of pH adjusting agent utilized is only dependent on the end result desired, i.e. a final pH of from 4.3 to 4.6 in the fruit cereal formulation.

The amount of apple puree utilized is not critical and may be employed in whatever proportions are desirable. In fact, the amount of apple puree may be varied from 30–70% by weight of the formulation.

Banana, in the form of a puree, is included for its flavor characteristics and may be added either in its frozen or aseptic puree form or dehydrated flake form. The amount employed will depend, of course, on the intensity of the banana flavor desired and can also be varied considerably. However, the preferred range includes 5–10%, although 2–20% by weight of banana puree based on the total weight of the formulation is also advantageous.

It will be understood by one of skill in this art that a "puree" is obtained by shearing the raw fruit to form a pulp which may be strained or sieved to insure uniform particle size.

Although any cereal grain flour can normally be employed in this art, for example, oat, wheat, corn, barley and the like, and mixtures thereof, it has been found that the advantages obtained herein are only germane to the employment of rice flour. Further advantage has been found in employing rice flour to constitute about 5–25% and preferably 10–15% by weight of the total formulation.

Sugar, preferably granulated white sugar, may be added in amounts up to 25% to assist in bringing out the natural fruit flavor. Sugar concentrations of from 10–15% by weight of the total formulation have been found to be especially desirable.

Other ingredients such as starch, waxy maize or tapioca, either modified or unmodified; salt, especially up to 2% by weight; and miscellaneous vitamin mixes may be incorporated in minor amounts for their obvious advantages.

Iron salts which have heretofore been employed as diet supplements are those which readily disassociate and include ferrous carbonate, ferrous citrate, ferrous sulfate, and the like and combinations thereof. They are normally utilized in minor amounts, such as up to 0.1% by weight of the formulation. Equivalent or equimolar amounts of ethylenediaminetetraacetic acid or a derivative thereof, in either the disodium form or disodium calcium form, is employed herein to complex with the iron salts prior to their incorporation with the formulation, thereby preventing the iron from reacting with the other components or catalyzing other reactions.

The novel wet precooked fruit cereal formulation of this invention can be prepared by any of the methods well-known to those of skill in the art. For example, the formulation can be prepared by mixing the rice flour, apple puree, banana puree, granulated white sugar, waxy maize or tapioca, either modified or unmodified, starch, and the iron salts, sequestered with an ethylenediaminetetraacetic acid compound; adjusting the consistency with water; and then adding sufficient pH adjusting agent to adjust the pH to the critical range of 4.3–4.6. The formulation is heated at a temperature of 150–200° F. to gelatinize the starch. Containers filled with the formulation are then processed according to the conventional processing methods employed in the canning industry.

To further illustrate the invention, the following example is provided. It should be understood that the details thereof are not to be regarded as limitations as they may be varied as will be understood by one skilled in this art. The percentages included throughout this disclosure are based on the total weight of the formulation prior to cooking, unless otherwise indicated.

A fruit-cereal formulation was prepared in the following proportions:

| Ingredient: | Quantity percent by weight |
|---|---|
| Apple puree | 58.00 |
| Rice flour | 10.00 |
| Granulated white sugar | 16.00 |
| Banana puree, frozen and deseeded | 5.00 |
| Starch, modified food | 5.00 |
| Tapioca starch | 5.00 |
| Vitamins, seasoning, etc. | .90 |
| Disodium ethylenediamine-tetraacetate dihydrate and iron sulfate ($FeSO_4 \cdot 7H_2O$) | .10 |
| | 100.00 |

Water was added to obtain a desired consistency and the pH was adjusted to about 4.4 with anhydrous disodium phosphate. The slurry was heated to 195° F. for 1 to 5 minutes. The formulation was pumped into small glass containers and processed in the manner conventional to the canning industry.

Although the foregoing invention has been described in some detail by way of illustration and example for purposes of clarity of understanding, it will be understood that certain changes and modifications may be practiced within the scope of the invention as limited only by the scope of the appended claims.

What is claimed is:

1. A wet, precooked fruit-cereal formulation, especially suitable for infant feeding, having a pH of about 4.3–4.6 and comprising rice flour, sequestered iron salts, apple puree and banana puree, said salts being sequestered with an agent effective to inhibit catalytic oxidation activity of the iron content thereof.

2. A formulation as described in claim 1 which includes a pH adjusting agent to control the pH of the formulation.

3. A formulation as described in claim 2 in which the pH adjusting agent is disodium phosphate.

4. A formulation as described in claim 2 in which the pH adjusting agent is citric acid.

5. A formulation as described in claim 1 wherein said sequestered iron salts are a complex of an ethylenediaminetetraacetate dihydrate and an iron salt selected from the group consisting of ferrous sulfate, ferrous carbonate and ferrous citrate.

6. A formulation as described in claim 5 wherein the ethylenediaminetetraacetate dihydrate is disodium calcium ethylenediaminetetraacetate dihydrate.

7. A formulation as described in claim 5 wherein the ethylenediaminetetraacetate dihydrate is disodium ethylenediaminetetraacetate dihydrate.

8. A process for preparing a wet, precooked fruit-cereal formulation especially suitable for infant feeding comprising: preparing an aqueous formulation of a rice flour, sequestered iron salts, an apple puree and a banana puree having a desirable consistency, said salts being sequestered with an agent affective to inhibit catalytic oxidation activity of the iron content thereof; adjusting the pH of the formulation to 4.3–4.6; preheating said formulation at a temperature and for a time sufficient to gelatinize the starch; thereafter filling containers with the formulation and processing by further heating to complete the cooking.

9. A process in accordance with claim 8 wherein said sequestered iron salt is a complex of an ethylenediaminetetraacetate dihydrate, and an iron salt selected from the group consisting of ferrous sulfate, ferrous carbonate and ferrous citrate.

10. A process in accordance with claim 9 wherein the ethylenediaminetetraacetate dihydrate is disodium calcium ethylenediaminetetraacetate dihydrate and the iron salt is ferrous sulfate.

References Cited

UNITED STATES PATENTS 2,187,718  1/1940  Wilbur _____ 99—186
2,559,022  7/1951  Lolkema _____ 99—83

RAYMOND N. JONES, *Primary Examiner.*

U.S. Cl. X.R.

99—18